P. MALCAMP.
PERCOLATOR.
APPLICATION FILED OCT. 27, 1917.
1,287,378.
Patented Dec. 10, 1918.
2 SHEETS—SHEET 1.
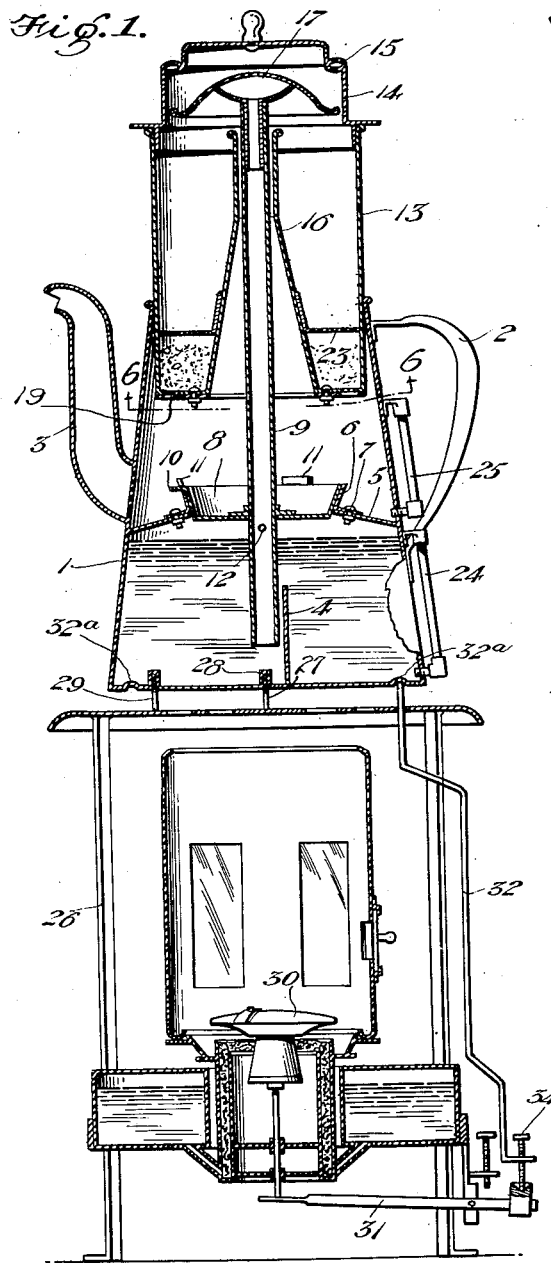
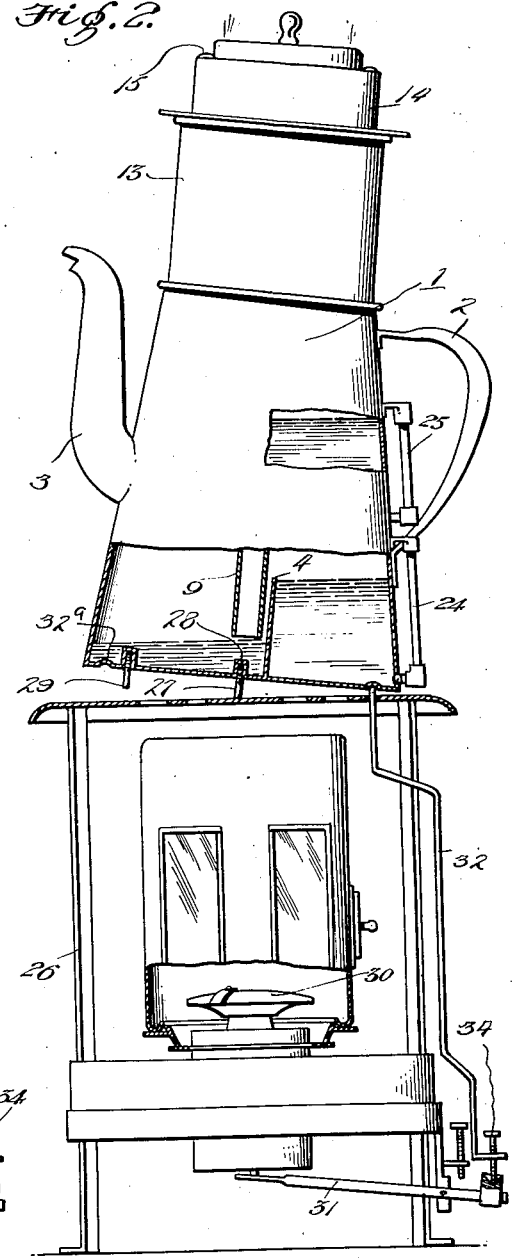
Witness
H. Woodard
Inventor
P. Malcamp
By Munn &co.
Attorneys

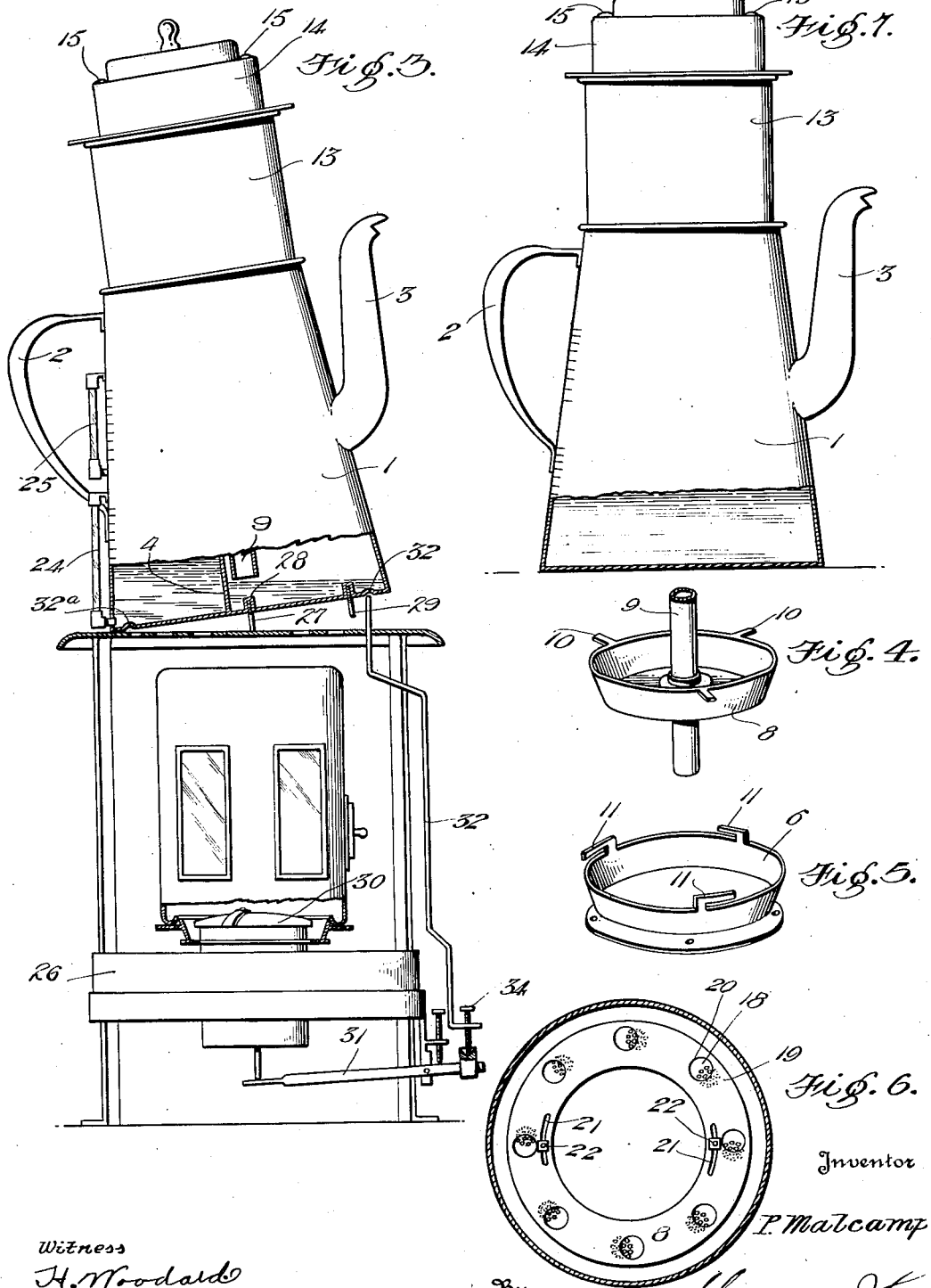

UNITED STATES PATENT OFFICE.

PHILIP MALCAMP, OF NEW ORLEANS, LOUISIANA.

PERCOLATOR.

1,287,378.  Specification of Letters Patent.  Patented Dec. 10, 1918.

Application filed October 27, 1917. Serial No. 198,798.

*To all whom it may concern:*

Be it known that I, PHILIP MALCAMP, a citizen of the Republic of France, and a resident of New Orleans, in the parish of Orleans and State of Louisiana, have invented certain new and useful Improvements in Percolators, of which the following is a specification.

My invention is an improvement in percolators, and has for its object to provide a percolator adapted for use with the heater forming the subject matter of my prior Patent No. 1,158,419, granted October 26, 1915, wherein the arrangement is such that the percolator may be arranged to retain the burner with a blue flame during the making of the coffee and to permit the heater to burn with a white flame after the coffee has been made, or wherein the percolator may be arranged to extinguish the heater when the coffee is made.

In the drawings:

Figure 1 is a vertical section through the improved percolator and the heater, showing the parts in position at the commencement of the operation of making the coffee.

Fig. 2 is a side view, partly in section, showing the position of the parts at the completion of the operation;

Fig. 3 shows the percolator so arranged that when the coffee is made the heater will be extinguished;

Fig. 4 is a perspective view of the valve;

Fig. 5 is a similar view of the valve seat;

Fig. 6 is a section on the line 6—6 of Fig. 1, looking in the direction of the arrows adjacent the line;

Fig. 7 is a side view of the percolator, with parts in section.

In the embodiment of the invention shown in Figs. 1 to 7, inclusive, the improved percolator comprises a body 1 of the usual tapering form having a handle 2 and a spout 3, and a partition 4 is arranged transversely of the percolator body at one side of the center. A partition 5 is provided within the body, just below the opening of the spout, and this partition has a central opening, at which is arranged a seat or ring 6 secured to the partition by screw bolt 7. Referring to Fig. 5 it will be noticed that the seat is of tapering form and has a flange fitting upon the upper face of the partition, the flange having openings through which the bolts are passed.

The closure 8 is carried by the percolating tube 9, and this closure is of a size to fit within the seat to close the communication between that portion of the body below the partition and that portion above. At its upper edge the closure has radial lugs 10, which are adapted to engage beneath circumferentially extending lugs 11 on the seat, to lock the closure to the seat, when the closure is turned in the proper direction with respect to the seat.

The percolating tube has an opening or openings 12 just below the closure to relieve the pressure below the partition when the water which is to form the coffee is heated. The holder for the coffee is a cylindrical body 13 having a cover 14, and the cover is provided with openings 15 for a purpose to be presently described. This cover fits within the holder, and the holder seats within the top of the body in the manner shown for closing the said top.

The tube 9 extends through the holder, passing through a central funnel shaped member 16 which forms a part of the holder, and the said tube is provided with a head 17 above the top of the funnel shaped member, the head fitting the upper end of the tube and having at its top a whistle. A concavo-convex screen is connected to the head, with its concave face downward, so that the water discharged from the tube is broken up and converted into spray by the screen which is, in fact, a spray head. The bottom of the holder, which is ring shaped, being between the funnel shaped portion 16 and the body, is provided with an annular series of openings 18 arranged in spaced relation, and a ring 19 is mounted to rotate below the bottom, the said ring having openings 20 which are adapted to register with the openings 18 in the bottom of the holder. This ring has arc shaped slots 21, and bolts and nuts 22 connect the ring to the bottom, the bolts being passed through the slots and through registering openings in the bottom into engagement with the nuts.

The coffee is held on the bottom of the holder, and a sieve 23 is arranged above the coffee in the holder to prevent the ground coffee from floating. Preferably, gages 24 and 25 are provided in connection with the body of the percolator for indicating the height of the water below the partition and above the partition, and it will be noticed that a scale is provided on the body adjacent each gage. These scales give the measurements for the proper depth of water to provide the desired amount of coffee. The percolator is supported on the heater, indicated generally at 26, by screws 27 a pair of which is provided, but one being shown, which are arranged in line diametrically of the bottom. These screws engage internally threaded nipples 28 in the bottom of the percolator, the arrangement being such that the percolator may rock upon the screws. A third screw 29 is provided at that side of the percolator remote from the partition 4, the said screw forming, with the screws 27, a tripod for supporting the percolator.

The heater which is shown and described in my prior patent has a damper 30 for regulating the flame. This damper is supported by one end of a lever 31 which has its larger end engaged by a rod 32 having guided movement vertically with respect to the heater. The upper end of this rod is adapted to engage a depression 32ª in the bottom of the percolator to hold the lever 31 in such position that the damper 30 will be lifted, so long as the percolator is balanced in the manner shown in Fig. 1 by the excess weight of water on that side of the partition 4 remote from the rod 32.

In operation, when it is desired to prepare coffee, the holder 13 is removed, with the tube 9 and the valve in place, and water is poured into the body of the percolator above the partition 5, until the proper amount for the purpose desired is obtained. This amount will be indicated on the gage 25, and after the water has been inserted the valve 6 is lifted to permit the water to run down into the space below the partition. The ground coffee is arranged within the holder, and the holder is replaced, after which the spray head is placed and the holder is covered.

The heater, when the parts are in the position of Fig. 1, will burn with a blue flame, and the water in the percolator will be heated, and during the heating, before the water comes to a boil, the steam may pass out through the openings 12 and to the tube 9. As soon, however, as the water begins to boil, the openings 12 will be closed by the boiling water and the water will be forced up through the tube 9 and will be sprayed upon the ground coffee in the holder. The sieve, being of fine mesh, will prevent the coffee from floating and the boiling water will extract all of the properties of the coffee grain, and it will gradually pass down through the coffee grounds to eventually pass through the openings 18 and 20. The size of these openings may be regulated, and upon the size will depend the rapidity of the passage of the water. When the water below the partition falls below the level of the lower end of the tube 9 it will no more pass up through the tube 9. Steam, however, will pass, and, passing through the whistle at the top of the tube, will cause a continuous whistle which will attract the attention of the person making the coffee. The steam passes out through the openings 15, after passing through the whistle. The partition 4 divides the space below the partition 5 into two compartments of unequal size, the tube 9 extending into the larger.

It will be noticed that the bottom of the tube is spaced above the bottom of the percolator, so that there will be some water left in the larger compartment when it falls below the lower end of the tube. This water and that in the smaller compartment will provide sufficient steam to whistle for some time. As the water is driven up through the tube 9 a portion of the water is retained in the small compartment, and this gradually overbalances the percolator, so that it tilts into the position of Fig. 2. When so tilted the lever 31 is pressed downwardly at its outer end, and the damper 30 is lifted to permit the flame to burn white.

The chimney of the heater has transparent panels as shown, and through these the white light is visible, illuminating the apartment where the coffee is being made. When it is desired that the heater be extinguished at the end of the operation of making coffee, the percolator is merely reversed on the heater, and it will be noticed that two recesses 32ª are provided in a line diametrical to the bottom of the percolator. When the percolator is reversed, as shown in Fig. 3, the other depression 32ª is brought into position for engagement by the rod 32. The operation is the same, but when the coffee is made, that is, when the water has been driven above the partition 5, the percolator will tilt away from the rod 32, and the damper 30 will be lowered, and the flame of the heater will be extinguished.

It will be noticed that the damper 30 has an opening which is closed by a plate 33, the said plate being pivoted to the damper in such manner that it may cover the opening, or may be moved away from over the opening.

When the damper is down the plate may be swung aside and the burner may be lighted. Since the damper covers all but a small portion of the wick there will be merely a pilot flame at the opening. When it is desired to arrange the percolator so that a minimum of trouble is required to make coffee in the morning the percolator is arranged as shown in Fig. 1 on retiring, but the screw 34 which is connected with the rod 32 and which engages the outer end of the lever 31 is turned up until the damper is in the position of Fig. 3. The cover plate of the damper is now moved aside and the pilot burner is lighted. When now the operator desires to make coffee in the morning, he merely turns the screw 34 until a blue flame appears through the panels of the chimney, and he may again sleep, knowing that when the operation of coffee making is complete the room will be lighted and the whistle will be blown.

I claim:

1. In combination, a heater having normally operative means for extinguishing the same, a vertically movable rod controlling said means and extending above the heater, a percolator comprising a body having a transverse partition provided with a central opening, a percolator tube adapted to extend through the opening and carrying a closure for closing the opening, a coffee holder fitting within the top of the body and through which the tube extends, the body having a vertical partition at one side of the center and of the percolator tube and stopping short of the transverse partition, said body having supporting legs arranged in a line diametrically thereof and having a third leg at the side of the body remote from the vertical partition, the controlling rod for the heater being adapted to engage the bottom of the percolator body when the percolator is seated on the heater at the opposite side from the third leg to hold the extinguishing means in inoperative position and to engage the percolator at the side adjacent to the third leg when the percolator is reversed on the heater to cause the percolator to release the rod when the coffee has been made.

2. A percolator comprising a body having a transverse partition intermediate its ends provided with a central opening, a percolator tube extending through the opening and having a closure for closing the same, a coffee holder seated in the top of the body and having a cover, the body having a vertical partition at one side of its center and of the percolator tube for dividing the holder into two compartments below the transverse partition and stopping short of the said partition, the body having a pair of supporting legs arranged on a diametrical line and a third leg at that side of the body remote from the partition.

3. A percolator comprising a body having a transverse partition, a percolator tube extending upwardly through the partition and adapted to give passage to the steam and water from the space below the partition to the space above the partition when the percolator is heated, a coffee holder seating within the body, the body having means for supporting the same so as to tilt when overbalanced at one side, and having a vertical partition near the said side and between the said side in the percolator tube to retain a portion of the water in the holder below the transverse partition after the bulk of the water in the percolator has been driven above the transverse partition through the percolator tube.

4. In a percolator, a coffee holder having a transverse perforate partition above the bottom thereof for holding the coffee, means for controlling the flow of the water from the holder to the percolator to retain said water in contact with the coffee when desired, a heater for heating the percolator, and means controlled by the position of the percolator on the heater for causing the heater to burn with a blue flame or with a white flame.

PHILIP MALCAMP.